United States Patent
Foresti

(10) Patent No.: US 12,418,533 B2
(45) Date of Patent: Sep. 16, 2025

(54) METHOD AND SYSTEM TO CAPTURE AND FIND INFORMATION AND RELATIONSHIPS

(71) Applicant: Stefano Foresti, Denair, CA (US)

(72) Inventor: Stefano Foresti, Denair, CA (US)

(73) Assignee: Stefano Foresti, Denair, CA (US)

( * ) Notice: Subject to any disclaimer, the term of this patent is extended or adjusted under 35 U.S.C. 154(b) by 604 days.

(21) Appl. No.: 17/393,992

(22) Filed: Aug. 4, 2021

(65) Prior Publication Data

US 2021/0367945 A1 Nov. 25, 2021

Related U.S. Application Data

(63) Continuation of application No. 15/169,510, filed on May 31, 2016, now Pat. No. 11,115,415, which is a continuation-in-part of application No. 14/471,614, filed on Aug. 28, 2014, now Pat. No. 10,719,541, which is a continuation-in-part of application No. 13/615,340, filed on Sep. 13, 2012, now Pat. No. 8,825,697, said application No. 14/471,614 is a continuation-in-part of application No. 14/308,473, filed on Jun. 18, 2014, now Pat. No. 8,949,268, which is a continuation-in-part of application No. 13/615,340, filed on Sep. 13, 2012, now Pat. No. 8,825,697.

(60) Provisional application No. 61/534,203, filed on Sep. 13, 2011, provisional application No. 61/595,693, filed on Feb. 7, 2012, provisional application No. 61/871,226, filed on Aug. 28, 2013.

(51) Int. Cl.
*H04L 29/06* (2006.01)
*G06F 16/2457* (2019.01)
*G06F 16/9535* (2019.01)
*G06F 21/62* (2013.01)
*H04L 9/40* (2022.01)

(52) U.S. Cl.
CPC ...... *H04L 63/101* (2013.01); *G06F 16/24573* (2019.01); *G06F 16/9535* (2019.01); *G06F 21/6218* (2013.01); *H04L 63/08* (2013.01)

(58) Field of Classification Search
CPC . H04L 63/101; H04L 63/08; G06F 16/24573; G06F 16/9535; G06F 21/6218
See application file for complete search history.

(56) References Cited

U.S. PATENT DOCUMENTS

| | | | |
|---|---|---|---|
| 8,745,698 B1 * | 6/2014 | Ashfield | H04L 63/08 726/4 |
| 9,037,864 B1 * | 5/2015 | Staddon | G06F 21/31 713/182 |
| 9,633,322 B1 * | 4/2017 | Burger | G06Q 20/405 |
| 2003/0154406 A1 * | 8/2003 | Honarvar | G07C 9/37 713/153 |
| 2007/0124321 A1 * | 5/2007 | Szydlo | H04L 9/3218 707/999.102 |

(Continued)

*Primary Examiner* — Vance M Little

(57) ABSTRACT

A method and system to improve the computer in light of the global information network with numerous computer devices services, and apps, so that a user can capture and find information with high security and usability. The invention makes all information potentially searchable on the Internet, and distinguishes finding the existence of an object of information from its access, and the ability for a searcher to request access to an object that is not permitted, and to enable the object owner to approve requests.

2 Claims, 11 Drawing Sheets

(56) References Cited

U.S. PATENT DOCUMENTS

| | | | |
|---|---|---|---|
| 2009/0006544 A1* | 1/2009 | Liu | H04L 51/04 709/203 |
| 2009/0276839 A1* | 11/2009 | Peneder | G06F 21/31 726/8 |
| 2009/0305670 A1* | 12/2009 | DeBoer | G06Q 20/40 455/411 |
| 2010/0228603 A1* | 9/2010 | Bolder | G06Q 30/0217 705/14.1 |
| 2012/0079576 A1* | 3/2012 | Han | H04L 9/321 726/7 |

* cited by examiner

METHOD AND SYSTEM TO CAPTURE AND FIND INFORMATION AND RELATIONSHIPS

CROSS-REFERENCE TO RELATED APPLICATIONS

This application is a continuation of U.S. Utility patent application Ser. No. 15/169,510, filed May 31, 2016, which claims benefit of Provisional Patent Application Ser. No. 62/168,814, filed May 31, 2015.

The U.S. Utility patent application Ser. No. 15/169,510 is a continuation-in-part of U.S. Utility patent application Ser. No. 14/471,614, filed Aug. 28, 2014, which claimed benefit of U.S. Provisional Patent Application Ser. No. 61/871,226, filed Aug. 28, 2013.

The U.S. Utility patent application Ser. No. 14/471,614, filed Aug. 28, 2014 is a continuation-in-part of U.S. Utility patent application Ser. No. 13/615,340, filed Sep. 13, 2012, which claimed benefit of U.S. Provisional Patent Application Ser. No. 61/534,203, filed Sep. 13, 2011, and Provisional Patent Application Ser. No. 61/595,693, filed Feb. 9, 2012.

The U.S. Utility patent application Ser. No. 14/471,614, filed Aug. 28, 2014 is also a continuation-in-part of U.S. Utility patent application Ser. No. 14/308,473, filed Jun. 18, 2014, which was a continuation of U.S. Utility patent application Ser. No. 13/615,340, filed Sep. 13, 2012.

Those prior applications are hereby incorporated by reference.

BACKGROUND

In parent application Ser. Nos. 13/615,340, 14/308,473, and 14/471,614 I described a solution to the problem generated by the explosion of information, devices and apps: it is ever harder to find information in context. Digital information surely cannot be found if it was lost or not captured by the computer in first place. First, while humans think of relationships among pieces of information, these may be hard or impossible to get captured by the computer with current apps: important input from humans is lost. Second, digital information gets replicated and scattered around devices, apps, accounts, and people, resulting in the loss of important relationships among who-what-when.

In this application I further describe how to improve the computer to capture who owns and controls data, information, or content, as well as the intention to permit finding and accessing them, further considering that the intention may change over time. The goal is to optimize both access and control, which are conflicting objectives: make information and content potentially accessible or findable by all people and devices connected worldwide on the global information network, yet supporting attribution, privacy, confidentiality, integrity, and mechanisms to reward its use.

The status quo of permissions to digital information by users on the Internet is mainly based on sharing and pushing. Also, users may use multiple services and communication channels for access control. As a result, users produce an enormous amount of information that gets disaggregated and may not be associated with the intended permissions: some information may be accessed by unintended users, while other information is not findable by users that were not intended to be blocked from accessing it. A user may share to selected people, or groups, or publicly, resulting in situations where either privacy, or search, or both fail. For instance:

I send content to one person: as a result, it is only searchable by this person, even though I have no intention to prevent others from finding it . . . but all others can't.

I want to share confidential content only with selected people, but have no way to know whether it gets in the hands of others . . . and it may.

I want to search available content by a person, so I ask to send it to me . . . it's burdensome.

Moreover, I may not be presented or find in a search all inventory potentially interesting to me.

In the reality of social and business relationships, permissions to information are not black and white. In many situations a user may have not yet decided whom to grant permission to, or may be convinced otherwise if requested. People may change mind; intentions may change over time and within a different context. For instance, here are other typical situations:

I am not sure whether I want to allow or prevent others to access this photo I just took.

An organization changes a policy affecting the permissions to access a certain document.

I may change mind whether I want a third party to know my GPS location.

On the other side of the coin, there is the point of view of who searches information, or who wants to access specific information that is known to exist. Someone may want to know if there exists something that may match a search, even if it is not permitted: it might be accessible if a permission was requested. Here are specific use cases.

A user, say Mary, wants the most recent photos that I took, which I did not post or upload or send, yet I am open to sharing. Mary searches and finds what she wants that was permitted to anyone. In the status quo, she would have to ask me and I would have to search, select, and share. In essence she can do the search instead of me.

In an organization, a user, say Joe, joins a project, and wants to search for material done by the project team member. Joe performs a keyword search by who, what, and when, and finds a list of possible results; he requests the team lead to get permission to access a selection of document that resulted in the search. The team lead will receive request, and clicks yes or no. In the status quo, the new team member Joe, would not have received emails form past conversation of the project, and may have to be granted access to all documents and folders in order to do any work.

A hospital may want to search data in patient records and request specific patients to access selected data for data analysis and science.

In summary, while the Internet has penetrated activity, and potentially every data could available on the Internet, there is part of data produced globally that would be made findable by the respective owners if the process was frictionless (there would be more supply); on the other hand, there are many searchers for data that do not find a match that may exist, because if is not searchable or permissible (there is unmet demand). This invention makes all information potentially searchable with permissions, and findable by who is permitted. Here some concepts are defined to support the rest of the specification.

Data. In this invention I call as information object, or object what the owner considered as a unity at the time of capture or creation. There is only one type of data: the global searchable database that is a registrar of information ownership and permission treats all data as equal; one datum is what the owner or author captured or created; more complex data is built as a composite. In the status quo, digital rights management systems tend to be data type specific (video, files, images, docs, photos, numbers, data bases . . . ); distinguishing a "video" from a "number" for the purpose of ownership definition results in other complications.

Ownership. An information object that is captured as newly created content, or selection and composition of existing content, is attributed to (or owned by) who performed the creation or selection (the identity of the owner). In this invention the terms of attribution and ownership are equivalent. The owner is also the entity that controls the access of such information object, and determines the permission intention.

Privacy. The use of the terms "proprietary" and "private" in material goods indicates that there is an owner that establishes if and how to deprive others. There exist mechanisms to register ownership in real estate, vehicles, and many products, using serial numbers. Today there is no systematic way to register or determine ownership or attribution of information; as a consequence it is not clear who can determine what data is, and the intention to permit its use: there is a widespread need to register data ownership. In this specification I refer to the registrar of captured information objects, including the owner, the time of capture, the unique global identifier, and the permissions: by registering data as captured or created along with ownership or attribution, then the intention shall be determined by the owner (who captured or created).

Evolution. Uncertainty and change are at the core of the humanity and the world. There are situations where the intention on the use of a property is not defined yet, or it is not defined for a future context and situation; also, human intention can change, rationally or irrationally. This invention supports the reality of human behavior: people may be unsure, may want to postpone decisions, and change their mind.

BRIEF SUMMARY OF THE INVENTION

Unique and novel concepts or additions to the inventions filed in the parent applications include permission user interfaces such as the "progressive symmetric permission": a permission model that enables the owner/creator of an object to define its permission proactively or reactively. With proactive permission I indicate that the owner of the object determines who can find and access the object with a white list and/or black list. With the reactive permission I indicate that the object is searchable by the system, findable by identities that are in the grey list, defined as identities that are neither in the white list nor in the black list, may request permission to access; the owner may accept the request, in which case the approved identities are added to the white list. In addition, progressive user interfaces enable to express the permission intention in a Q&A fashion, to help making sure that lists are inclusive and to decrease the likelihood of errors. As a result, the registrar makes content immediately searchable (by who-what-when), but only findable or requestable by whom is permitted. Data is pulled, so it's trackable, and transactions can be accounted for.

The overall invention of this application and the parent applications is a framework and user experience to register the ownership and the permission intention of information: the goal is to increase both availability and privacy (access and control). This invention provides an alternative to the status quo where privacy and search are in conflict: on the one hand, complicated security makes information hard to find by legitimate users; on the other hand, pushing and replicating data with no accountability results in services and people that use, broker, and monetize any information indiscriminately.

With this invention, search and privacy are no longer n conflict. Individuals and organizations can notarize ownership of information, and their intention and consequences of its use. Ownership and permissions of data are verifiable, and everyone has the ability to search to even broader and more accountable information than today. This global searchable registrar facilitates liquidity and accountability of information, and provides the basis for the global information marketplace.

Findability and accessibility. In this invention I separate the concept of access to an information object, and its findability. Access to an information object consists of a user viewing and using its content. Findability consists of a user knowing the existence of such an object, either as a result of a search (e.g. keyword search) or stumbling upon this object in lists, hyperlinks, etc. If the computer (search algorithm) finds an object as result of a search by a user, the existence of such result is presented to such user only if the object was permitted as findable by such user. Likewise, the computer knows whether an object supposedly referenced by a hyperlink exists or not: if a user that is not permitted stumbles upon this hyperlink, then clicking the hyperlink by this non-permitted user results in a message that the object may not exist. Also, while an object that is findable by a user may not be accessible by the user, an object that is accessible by a user is findable by that user. Each and every information object is searchable by the computer, and its metadata is searchable in the global searchable database registrar via the Internet: if a user that performs a search (e.g. keyword search) where there exists a specific object matching the search, then the result to the searcher (user who has performed the search) can be presented in one of the following ways:

such object results as non-existent or hidden (i.e. this result is not given to the searcher)

such object results as existent, but inaccessible to the user; this user has the ability to request access, and if the owner approves such request, then the object can be accessed by such user.

such object results existent and accessible by the user who performed the matching search.

This supports the case for separating the ability to find objects (their existence) in searches, and accessing objects that are results of searches, or that are stumbled upon, or linked to other objects.

The grey list. A user that owns or controls access to information may know whom to grant access to (white list) and whom to prohibit access to (black list); however, the owner may not know the existence of all the users in the world and of future users that do not exist today: the owner may not know how to set the permission for such users, which can potentially search in the global searchable database. Also, the owner may not know what permission to grant to some existing known users. I define as a grey list as the list of identities that are permitted to know the existence of an object, cannot access it, but may request access. Identities in the grey list include, but are not limited to, identities that were not known by the owner, identities that the owner may grant permission if they request it, new identities generated after the permission is generated and registered, and generally identities that the owner is not sure how to handle. Here I describe the white, black, and grey lists as it relates to the concept of accessibility and findability (knowing the existence). Given an object:

White list: users or identities that are permitted to find and access the object.

Black list: users or identities that are not permitted to find and, even less, access the object.

Grey list: users or identities that are permitted to find, but not to access.

A user or identity in the grey list of a specific object can request the permission to access the object, and this may result in one of the following:

If the owner approves, the user or identity is moved to white list.

If the owner rejects, the user or identity is moved to black list.

If the owner ignores, the user or identity remains in the grey list.

Proactive permission: the owner of the object determines who can find and access the object with a white list and/or black list.

Reactive permission: the object is searchable by the system, findable by who is not in the black list (the existence of the object may be presented to the searcher) and identities that are in the grey list, defined as identities that are neither in the white list nor in the black list may request permission to access the object; the owner may accept the request, in which case the approved identity is added to the white list. The reactive permission can be extended to allow the owner of an object to be notified that an identity in a black or gray list have performed a search where this object is a result, and even in the case where the grey listed user does not follow up with a request of permission. The owner could decide to change the permission based on seeing the identities of the request, and the searchers could be notified.

Symmetric permission. The symmetric permission enables the owner/creator of an object to define its permission proactively or reactively. In other words, it enables to determine a white list, a black list, which are proactive lists, and a grey list, which is a reactive list.

Progressive expression of permission. The progressive expression of a permission, and the progressive user interface were explained in application Ser. No. 14/471,614. A user is provided by the computer a progressive and interactive process to express the intention about how to permit or block access to specific information, and to fully capture the intention of the user about who can or must not access it. The progressive permission enables to add and remove identities from the white or black list till the permission is completed. The concept of progressive expression of permission is extended here to the concepts of findability and accessibility, and the grey list. The purpose of the progressive permission is to make the user interface very quick and easy for simple and common permissions; additional options get introduced progressively, only if needed. The time and effort needed to deal with permissions setting should be proportional to the desired level of security and the complexity of the access control. The progressive user interfaces enable to express the permission intention in a Q&A fashion, to be inclusive yet prevent errors.

User interface for the progressive symmetric expression of permission. The progressive symmetric permission can be described with a red, yellow, and green permission user interface. The colors red, yellow and green are used for reference to explain the concept, and they represent an embodiment of the user interface. However, the same concepts could be represented with different colors, or with different user interfaces. The basic, "one click" symmetric permission user interface is described as follows.

Red: just me, no one else can find or request (white: I, grey: no one, black: everyone else).

Yellow: just me, but findable by others, and access can be requested (white: I, grey: everyone else, black: no one).

Green: findable and accessible by anyone without request (white: everyone, grey: no one, black: no one).

If the user specifies a white list, the symmetric permission user interface is expanded as follows:

Red+W: restricted to white list, no one else can find or request.

Yellow+W: restricted to white list, but findable by others, and access can be requested.

Green+W: meant for a white list, but findable and accessible by anyone without request.

If the user specifies a black list, the symmetric permission user interface is expanded as follows:

Red+B: no one can find or request.

Yellow+B: findable only by grey list that can request access, black list that can't even find.

Green+B: accessible by anyone without request, except the black list that can't even find.

If the user specifies a white and a black list, the symmetric permission user interface is expanded as follows:

Red+WB: restricted to white list, no one else can find or request.

Yellow+WB: restricted to white list, but findable by grey list that can request access, black list that can't even find.

Green+WB: accessible by anyone without request, except the black list that can't even find.

It may seem superfluous to have a white list with a green permission, or a black list with a red permission. However, this may be useful when changing permissions: if the owner wants to change from green to red, the white list now has access, not requiring the owner to specify it again. Likewise, if the owner wants to change from red to green, the black list could be left.

The searcher's point of view. From the point of view of the demand (the user who is searching and may present an identity) all information is potentially searchable on the Internet by the computer in the global searchable database. The computer knows whether an object is a result of the search, and can do one of the following:

Black listed users: don't reveal existence, and potentially notify the owner that may change the permission based on who is searching.

Grey listed users: reveal the existence and allow the searcher to request permission.

White listed users: reveal the existence and fulfill access if requested.

In this application, the details of black lists are not specified again, because they were described in the parent application Ser. No. 14/471,614. The mechanisms in the user interface to specify black lists is equivalent to the white list.

DETAILED DESCRIPTION

Figure 1:
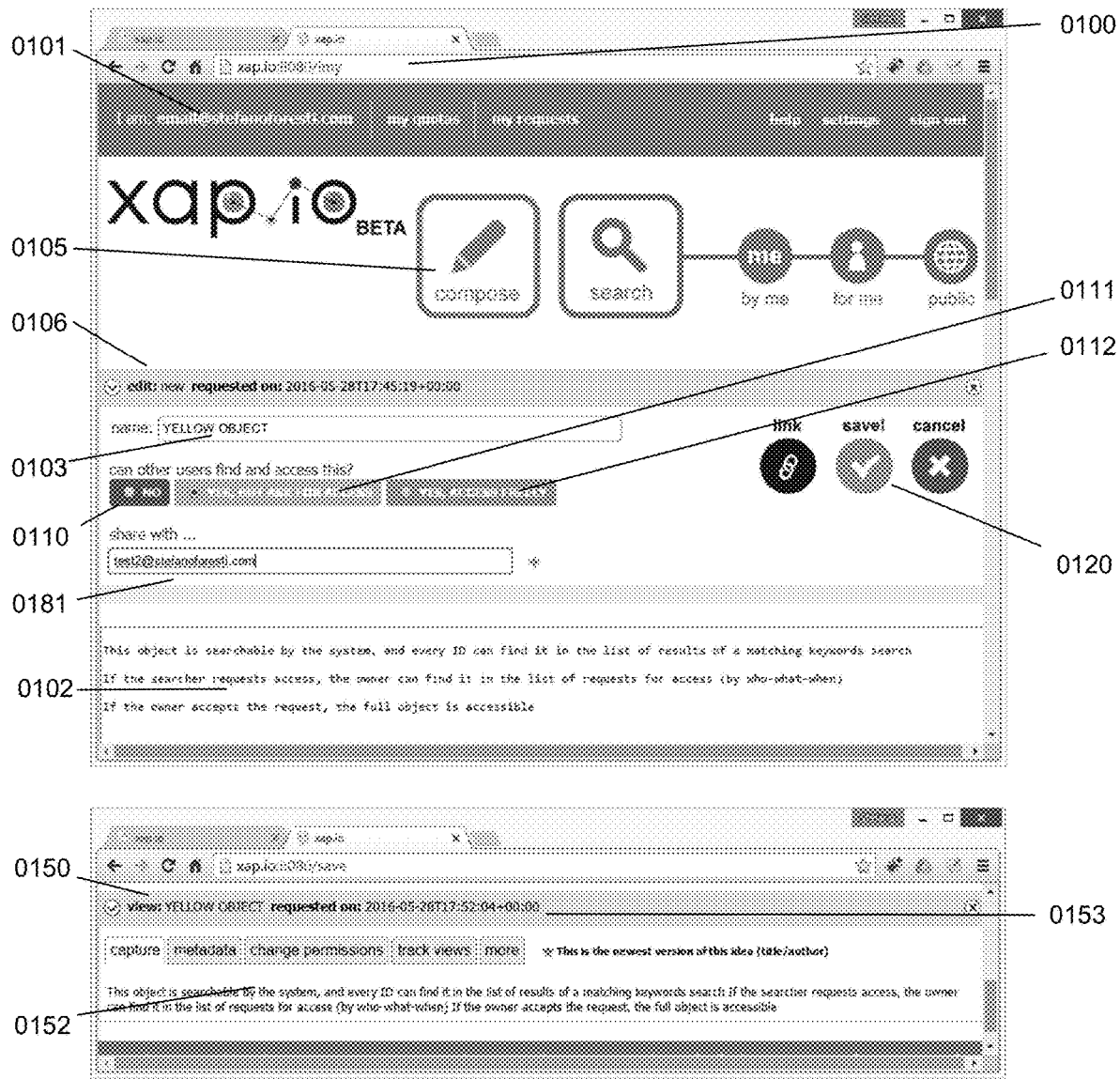
FIG. 1 shows an embodiment of the computer service when a user sets a yellow permission, to enable a grey list in addition to a white list and a black list.

FIG. 1 shows an embodiment of the computer service when a user (owner) captures an object and decides to make this object findable by others, but wanting to approve requests of access. This embodiment of the web user interface 0100 is presented to the user with an ID 0101 who is capturing a new object. In this embodiment, the user has selected to compose 0105 new content 0102 and assign a name to the object 0103. The user 0101 is referred to as the owner: it is the user to whom the object is attributed to, and has the right and capability to decide the permission of this object 0102. The owner can decide whether other users can find and access this object by selecting one of the options: 0110 (red: find and access=no), or 0111 (yellow: find=yes, access=can ask), or 0112 (green: find and access=yes). The owner selects option 0111 to reflect the interest to make this object findable by others, and wanting to approve requests of access. The owner also selects to grant permission to a user with identity 0181: the user with this identity 0181 will be able to find access without a request. The owner saves 0120 the object and permission selection. The captured content 0152 at time 0153 can now be viewed 0150 along with other metadata and options that were explained in the parent application.

Figure 2:
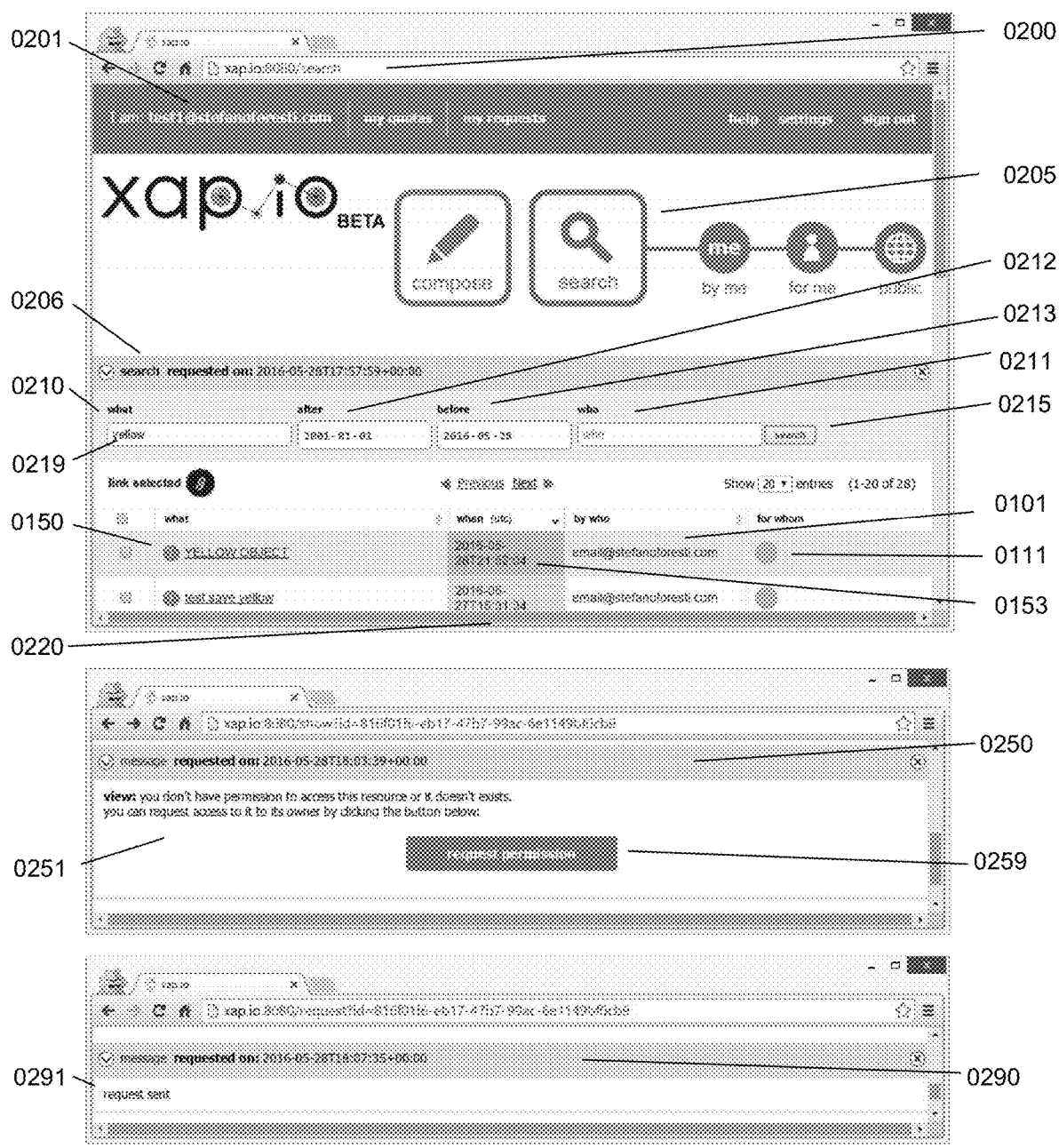
FIG. 2 shows a searcher in the grey list who finds a yellow object content and asks for permission to access.

FIG. 2 shows another user with identity 0201 that is performing a search in a web user interface 0200 of the global searchable database and registrar. The user 0201 selects to search 0205 and performs a keyword search 0206 with the option to search by what 0210 and/or by who 0211 and/or by when (entering a range, after time 0212 and before time 0213). In this scenario, user 0201 performs a search by what for the keyword yellow 0219, completes the search 0215 and receives a list of resulting objects 0220 matching the search. Among those results there is object 0150 captured by user 0101 in FIG. 1. The object 0230 was captured by user 0101 at time 0153 and was given the permission 0111; the searcher user 0201 can only see that the permission was yellow, indicating that it is findable but not accessible. The user 0201 decides to try and see whether it is possible to access the object and clicks 0150 which leads to a permission screen 0250 indicating that the object is not permitted to 0201 or it does not exist 0251; however, 0201 can request a permission to access if it exists 0259. The user clicks 0259 which will save in the global searchable database the request for user 0101, while the user 0201 receives a message 0290 that the request is sent 0291.

Figure 3:
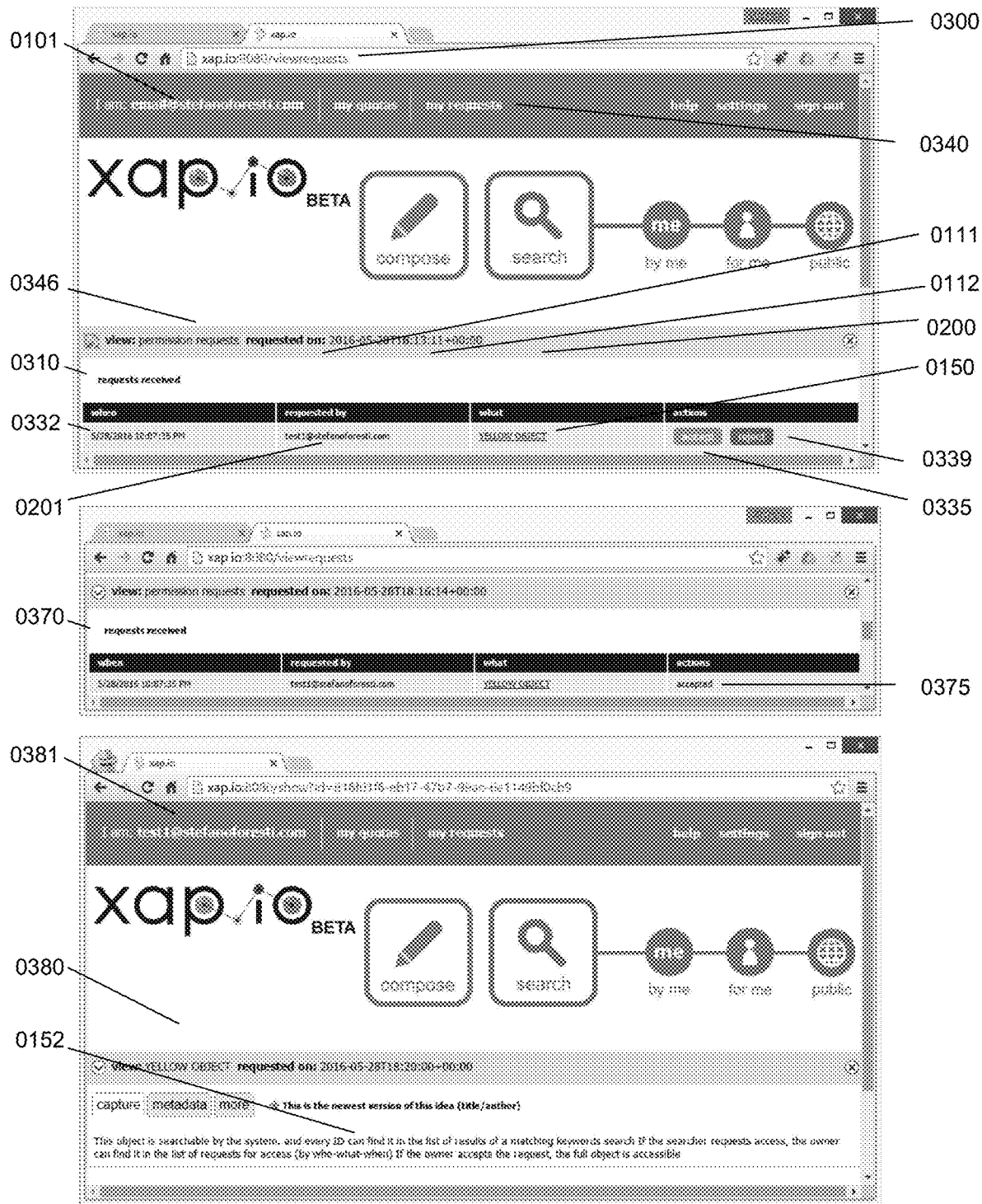
FIG. 3 shows the owner of a yellow object accessing the grey list of requests, and approving access to a user who gets added to the white list.

FIG. 3 shows the user 0101 that wants access the list of requests of owned yellow objects. The user 0101 clicks 0340 which produces a screen 0346 with a list of requests received 0310. This list includes the object 0150 requested by user 0201 at the time 0332. The owner 0101 has the option to reject 0339 (adding the user 0201 to the black list) or ignore (leaving the situation as the same, with the user 0201 in the grey list), or accepting 0335 (adding user 0201 to the white list). In this scenario, user 0101 accepts by clicking 0335: this changes the list of requests from 0310 to 0370, where the options 0335 and 0339 are replaced with 0375 (accepted). As a result, user 0201 is in the white list for object 0150 and can now access the object 0150. User 0201 later clicks on 0150 and the object is now accessed viewing the content 0152 captured by 0101.

Figure 4:
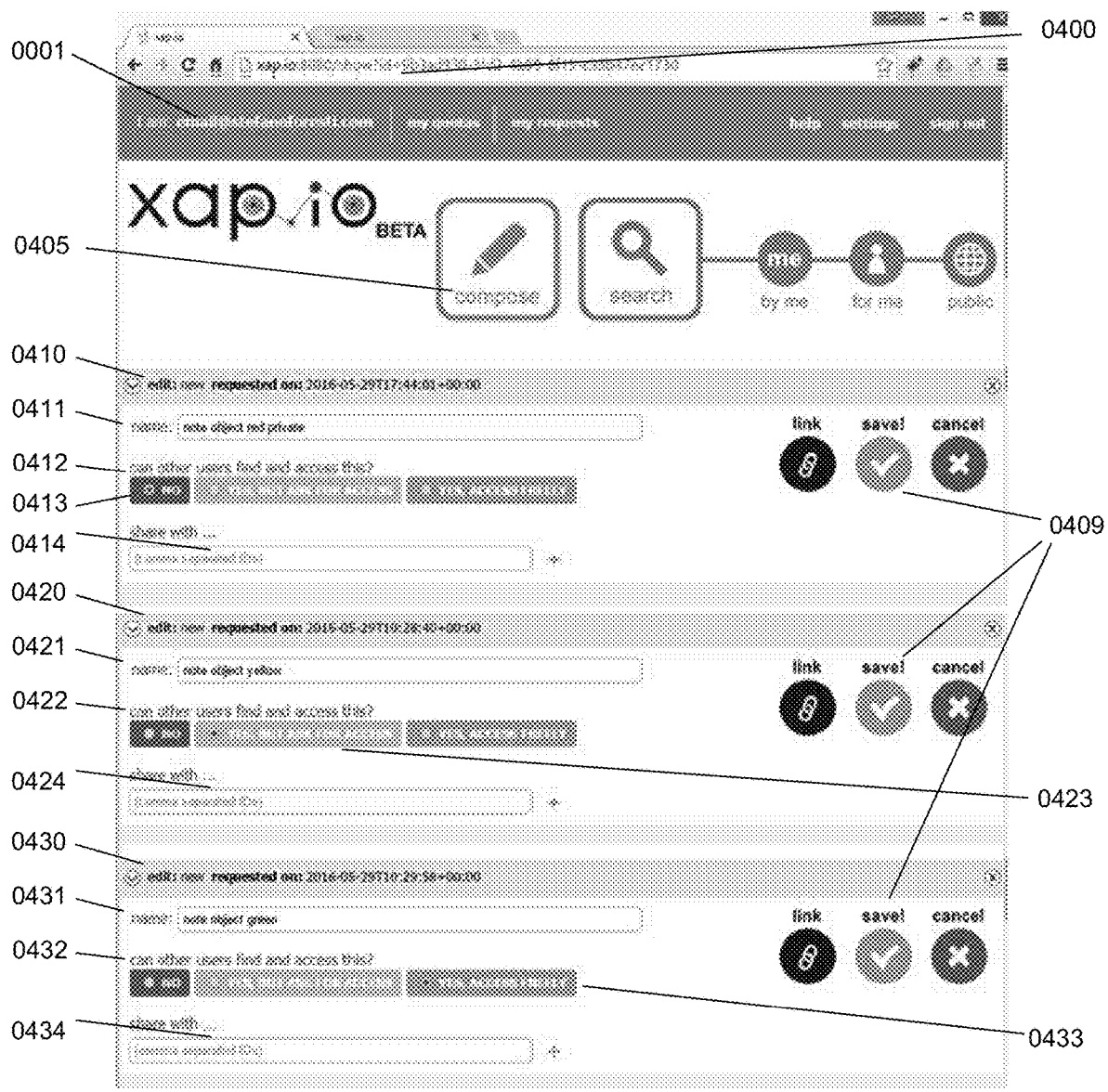
FIG. 4 shows a user interface and scenarios of capturing a red, a yellow and a green object.

FIG. 4 shows how the user with ID 0101 now captures multiple objects with different permissions.

First, a new 0410 object (name: note object red private 0411), with the permission 0412 for the new object 0410 as red 0413 (can other users find and access: no). The user 0101 also does not choose to specifically share with anyone so the white list 0414 results as empty. The owner 0101 completes the capture of selected content and permission 0409. With this permission 0413 the object 0410 will be only findable and accessible by the owner 0101: all other IDs will not find the object in searches, stumbling on a URL, or other ways; the hash will not reveal the existence of such object. Notice that a black list could be added with an equivalent GUI to the white list 0414, and the explained in the parent patent application.

Second, a new 0420 object (name: note object yellow 0421) with the permission 0422 for the new object 0420 as yellow 0423 (can other users find and access: yes, but ask for access). The user 0101 also does not choose to specifically share with anyone so the white list 0424 results as empty. The owner 0101 completes the capture of selected content and permission 0409. With this permission 0423 the object 0420 will be accessible only by the owner 0101: all other IDs can find the object in searches, stumbling on a URL, etc. and access can be requested. Notice that a black list could be added with an equivalent GUI to the white list 0424, so that the users in the black list would not find the existence of object 0420.

Third, a new 0430 object (name: note object green 0431) with the permission 0432 for the new object 0430 as green 0433 (can other users find and access: yes). The user 0101 also does not choose to specifically share with anyone so the white list 0434 results as empty. The owner 0101 completes the capture of selected content and permission 0409. With this permission 0433 the object 0430 will be accessible by every user or ID. Notice that a black list could be added with an equivalent GUI to the white list 0434, so that the users in the black list would not find the existence of object 0430.

Figure 5:
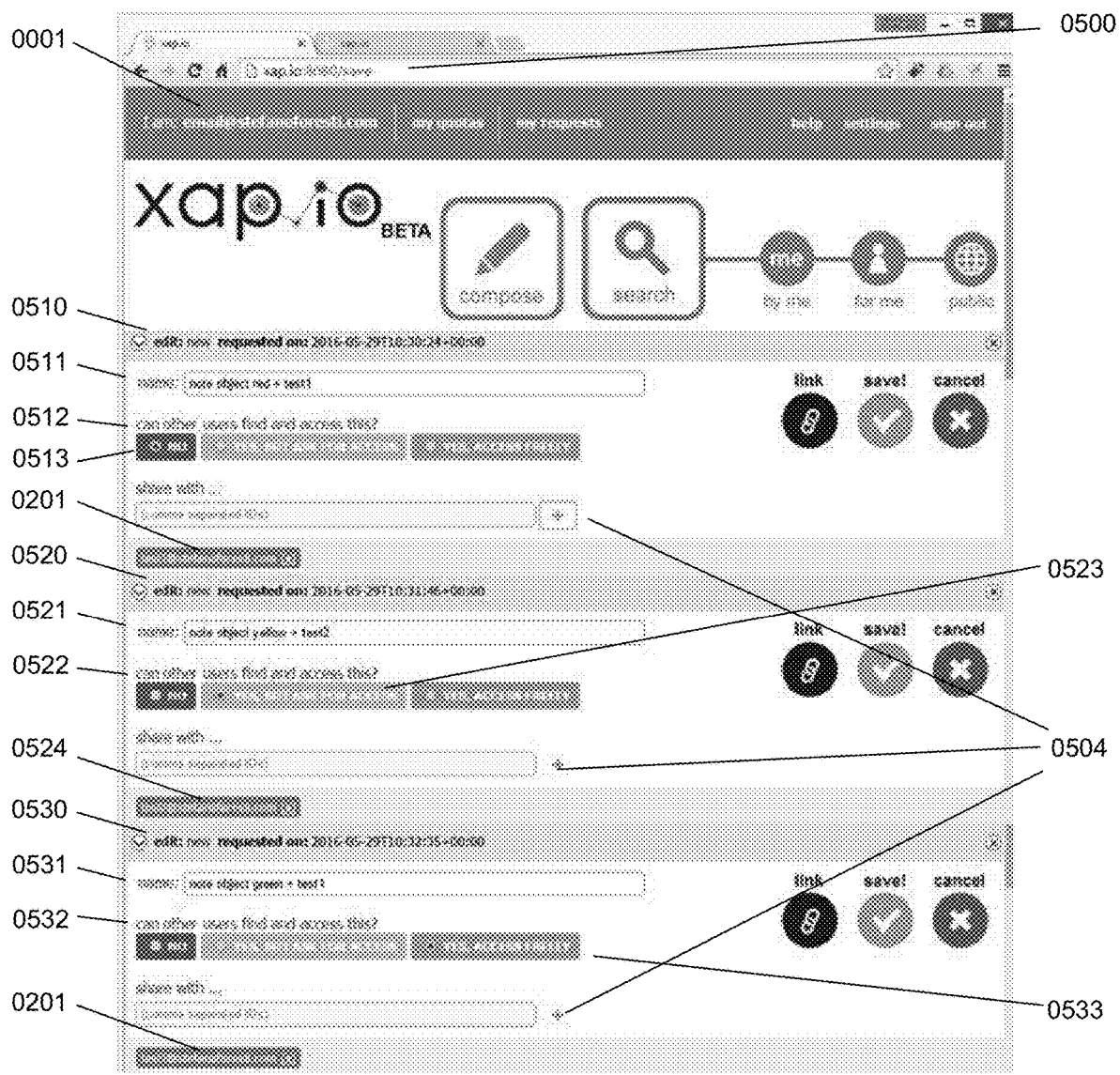
FIG. 5 shows a user interface and scenarios of capturing a red, a yellow and a green object with white listed users.

FIG. 5 shows how the user with ID 0101 now captures more objects with different permissions, including a white list generated in a progressive manner.

First, a new 0510 object (name: note object red+test1 0511) with permission 0512 for the new object 0510 as red 0513 (can other users find and access: no). The user 0101 has added user 0201 to the white list. With this permission 0512 the object 0510 will be findable and accessible by the owner 0101 and user 0201: all other IDs will not find the object in searches, stumbling on a URL, or other ways; the hash will not reveal the existence of such object. Notice that a black list could be added with an equivalent GUI to the white list 0201, which would not make a difference in this scenario, but could be useful if the permission is changed later from red to yellow or green, thus keeping the black list as it was while there us a change for the rest of the world.

Second, a new 0520 object (name: note object yellow+test2 0521) with permission 0522 for the new object 0520 as yellow 0523 (can other users find and access: yes, but ask for access). The user 0101 has added user 0524 to the white list. With this permission 0523 the object 0520 will be accessible by the owner 0101 and user 0524: all other IDs can find the object in searches, stumbling on a URL, etc. and access can be requested. Notice that a black list could be added with an equivalent GUI to the white list 0524, so that the users in the black list would not find the existence of object 0520.

Third, a new 0530 object (name: note object green+test1 0531) with the permission 0532 for the new object 0530 as green 0533 (can other users find and access: yes). The user 0101 has added user 0201 to the white list: this does not add to the fact that with this permission 0533 the object 0530 will be accessible by every user or ID; however, by adding 0201 to the white list user 0201 will remain in the white list if in the future a change from green to yellow or red will be made by owner 0101. Notice that a black list could be added with an equivalent GUI to the white list 0534, so that the users in the black list would not find the existence of object 0530.

Figure 6:
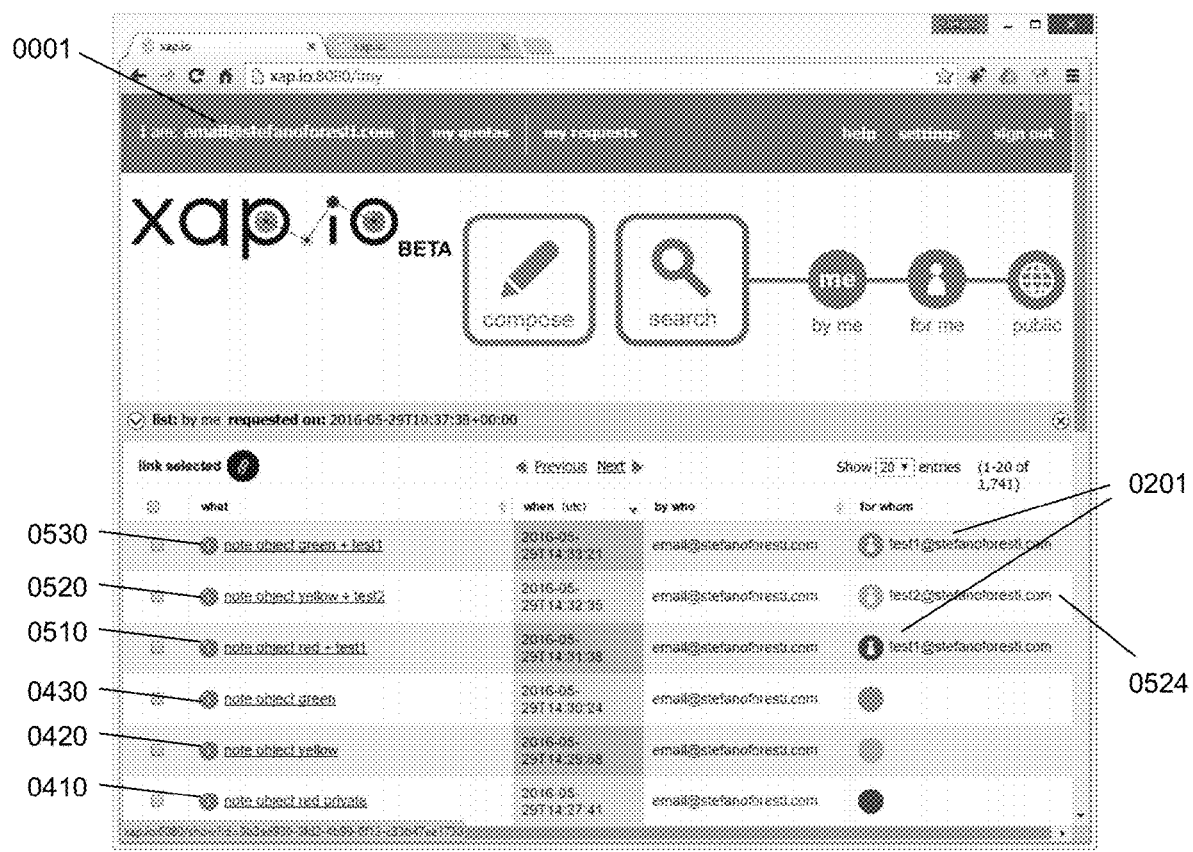
FIG. 6 shows the list of results by the owner.

FIG. 6 shows the list of objects just captured by user with ID 0101, and part of the metadata: a name, when was captured, who captured (the owner 0101), the white list, and the overall permission (red, or yellow, or green, including if there is a white list). Notice that the black list could be added as well. This search returns the objects that were captured and shown in all previous figures: 0410, 0420, 0430, 0510, 0520, 0530.
- 0410: "note object red private" permission red+whitelist: none
- 0420: "note object yellow" permission yellow+whitelist: none
- 0430: "note object green" permission green+whitelist: none
- 0510: "note object red+test1" permission red+whitelist: user 0201
- 0520: "note object yellow+test2" permission yellow+whitelist: user 0524
- 0530: "note object green+test1" permission green+whitelist: user 0201

Figure 7:
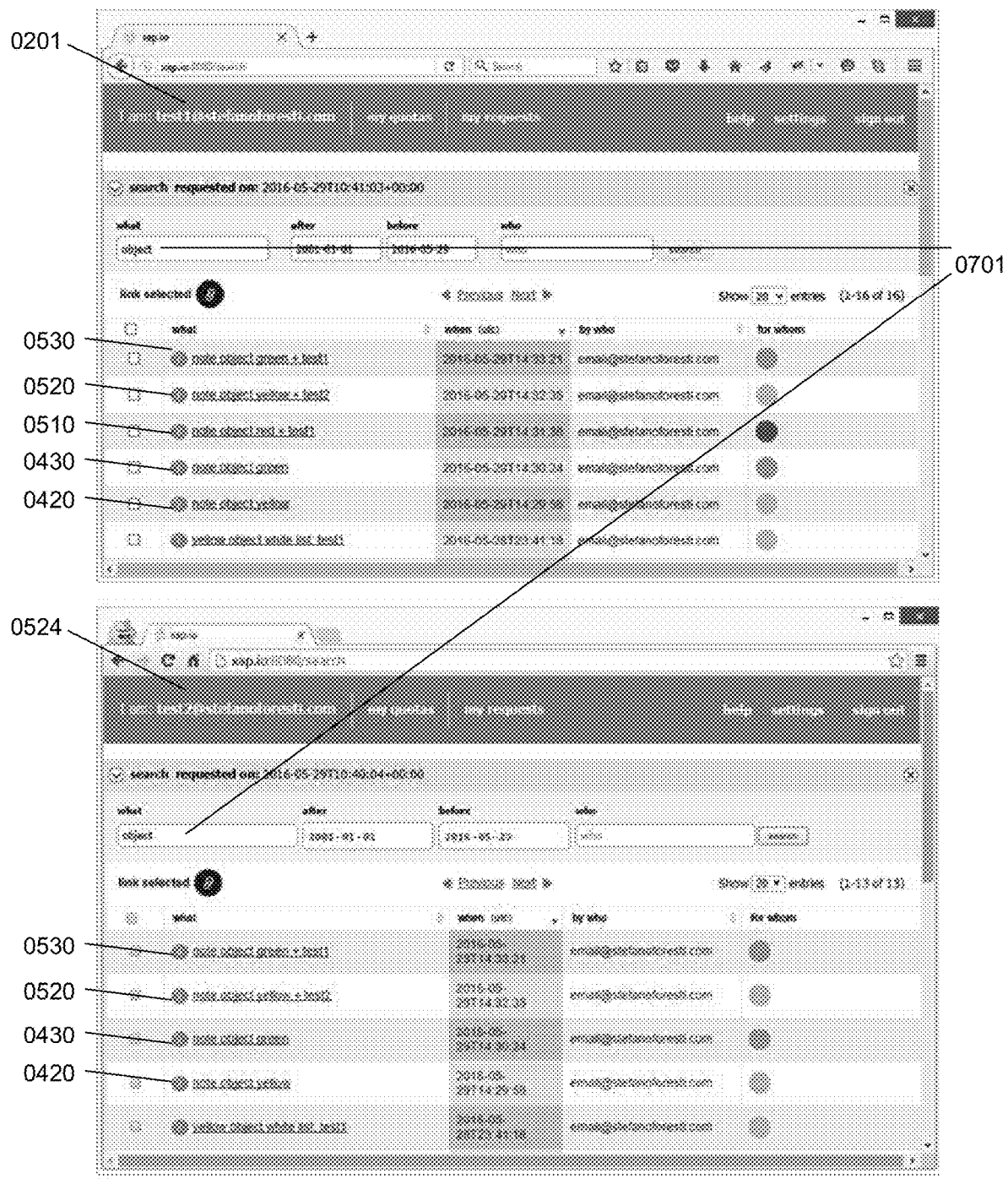
FIG. 7 shows the list of results by two different users that were differently permitted on a set of objects by their owner.

FIG. 7 shows the list of objects that are found in a search by the keyword "object" 0701 respectively by user 0201 (test1 . . . ) and 0524 (test2 . . . ):
- 0201: found: 0420, 0430, 0510, 0520, 0530
- 0524: found 0420, 0430, 0520, 0530

Figure 8:
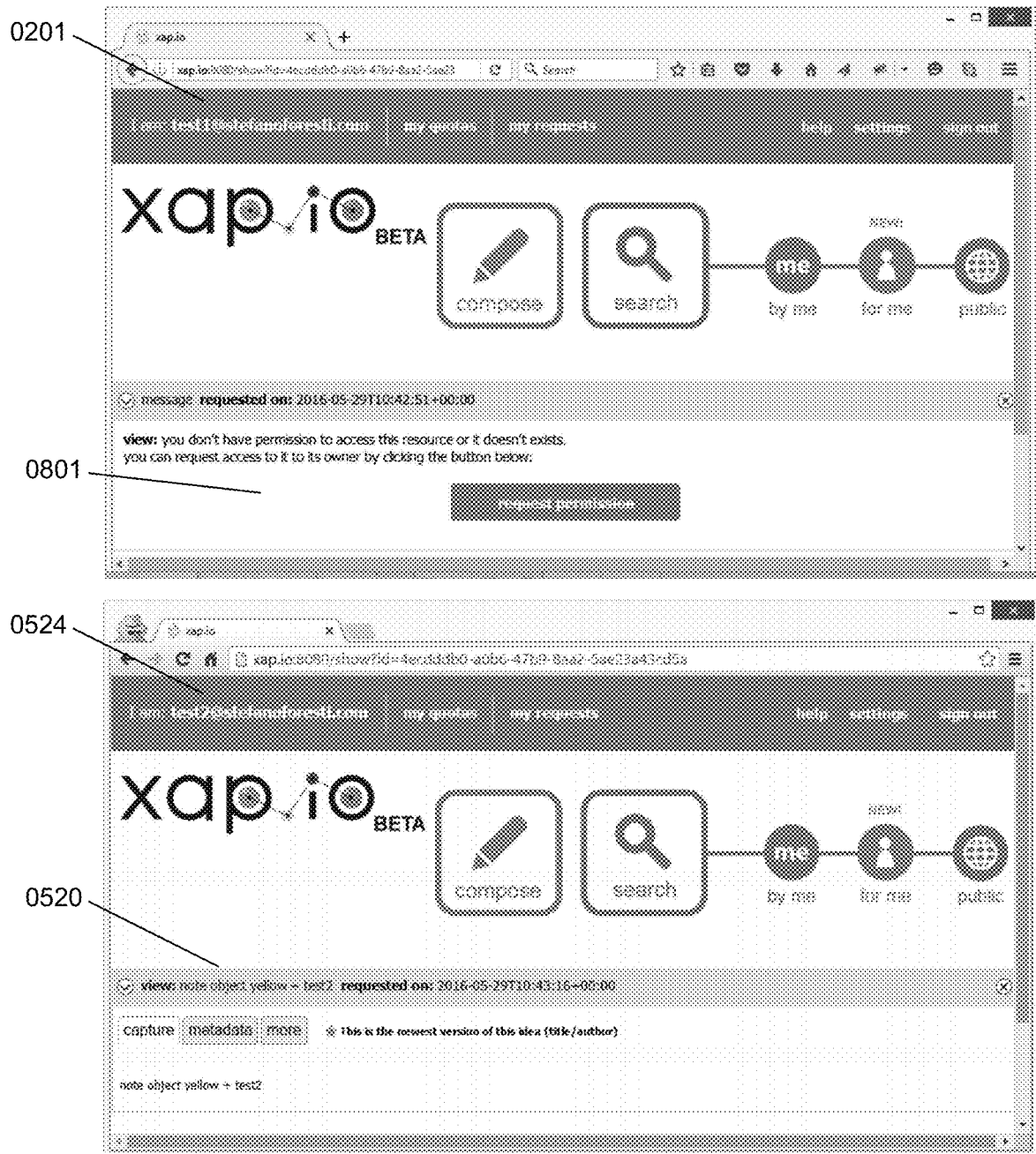
FIG. 8 shows the different result trying to access the same object by two users.

FIG. 8 shows the result of clicking the object 0520 respectively by user 0201 (test1 . . . ) and 0524 (test2 . . . ). User 0201 (not in white list, for a yellow object) receives the message 0801 that the object is not permitted or may not exist, with the possibility to request access in case it exists. User 0524 promptly accesses the object 0520 because 0524 was on its white list.

Figure 9:
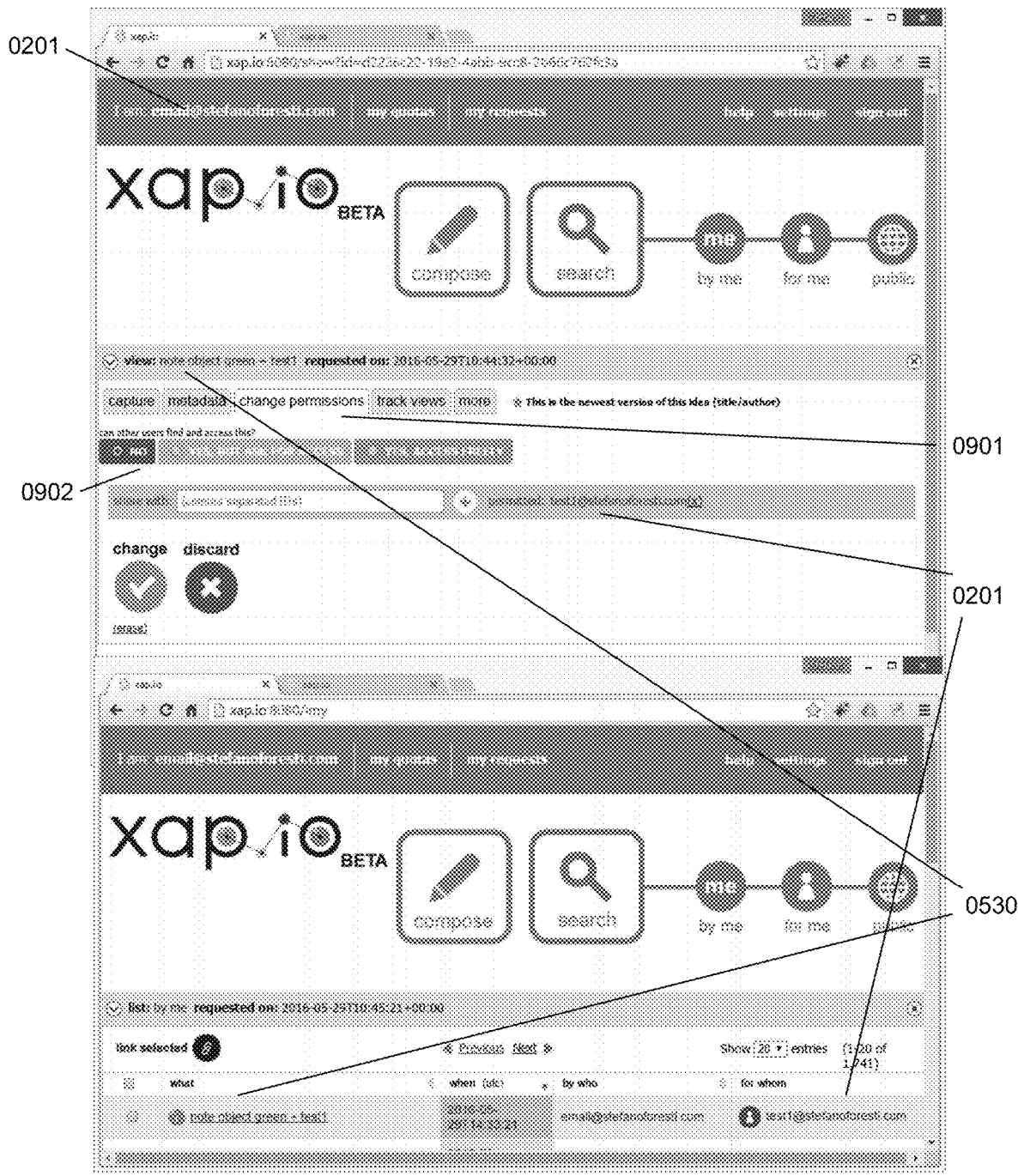
FIG. 9 shows a change of permission.

FIG. 9 shows that user 0101 decides to change the permission 0901 of the object 0530: the green permission is changed to red 0902, but the white list is not changed, leaving 0201.

Figure 10:
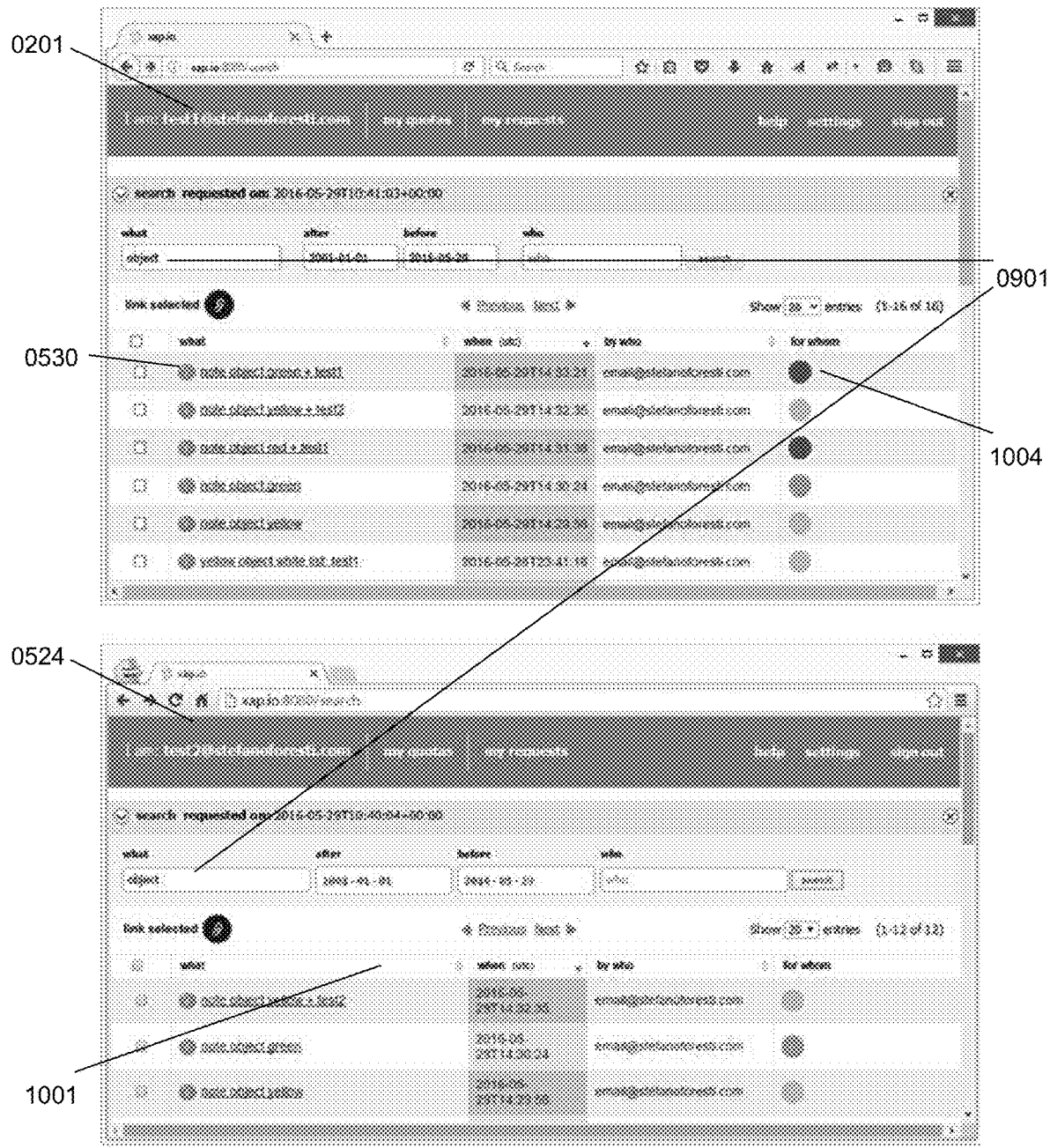
FIG. 10 shows the changes of results to of the same search by two users, after a change of permission.

FIG. 10 shows the list of objects that are found by repeating a search by the keyword "object" 0701 respectively by user 0201 (test1 . . . ) and 0524 (test2 . . . ) after user 0101 has changed the permission of object 0530 (from green with white list: 0201, to red with white list 0201). It is possible to see that object 0530 is still found by user 0201 in that search, though the permission color has changed to red 1004. Instead, user 0524 does not have as a result the object 0520 in the list of results 1001 of the same search.

Figure 11:
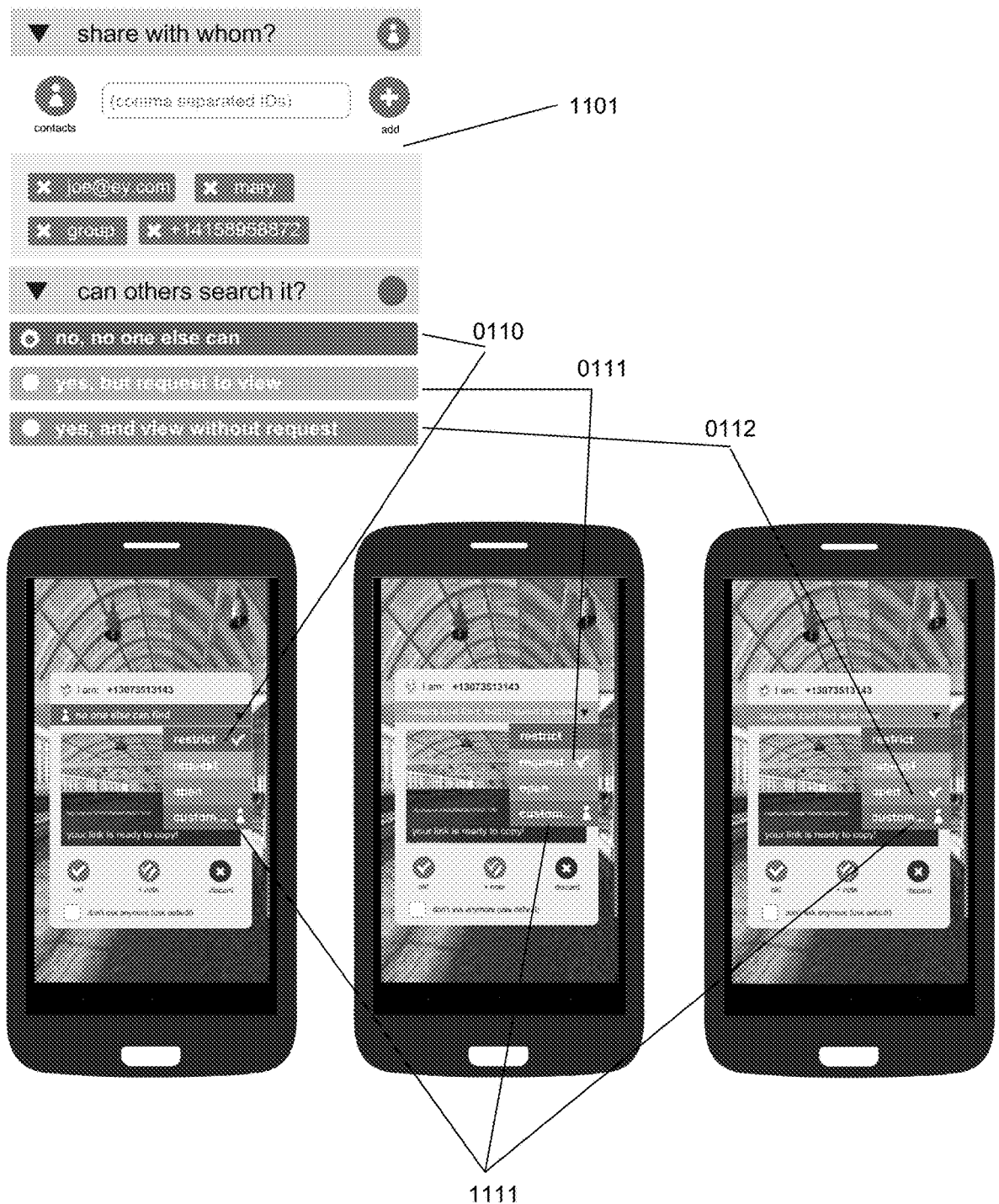
FIG. 11 shows the mobile progressive symmetric permission for a mobile device.

FIG. 11 shows an embodiment of the progressive symmetric permission on a mobile device. Given a new or existing capture, the permission setting includes the option of red 0110, yellow 0111, green 0112, and an option 1111 to open a custom screen to set white lists and black lists. The complete progressive permission screen for mobile 1111 opens and it contains the same options as described in the previous figures, and the parent patent application.

OTHER EMBODIMENTS

Other digital computer system configurations can also be employed to perform the method of our techniques, and to the extent that a particular system configuration is capable of performing the method of our techniques, it is equivalent to the digital computer system described here, and within the scope and spirit of our techniques.

Once they are programmed to perform particular functions pursuant to instructions from program software that implements the method of our techniques, such digital computer systems in effect become special-purpose computers particular to the method of our techniques. The techniques necessary for this are well-known to those skilled in the art of computer systems.

Computer programs for creating the special-purpose computer supporting the method of our techniques will commonly be distributed to users on a non-transitory distribution medium such as floppy disk or CD-ROM. From there, they will often be copied to a hard disk, flash memory, or a similar intermediate storage medium. When the programs are to be run, they will be loaded either from their distribution medium or their intermediate storage medium into the execution memory of the computer, configuring the computer to support the method of our techniques. All these operations are well-known to those skilled in the art of computer systems.

The term "non-transitory computer-readable medium" encompasses non-transitory distribution media, intermediate storage media, execution memory of a computer, and any other non-transitory medium or device capable of storing for later reading by a computer a computer program implementing the method of our techniques.

It is to be understood that the above described embodiments are merely illustrative of numerous and varied other embodiments which may constitute applications of the principles of our techniques. Such other embodiments may be readily devised by those skilled in the art without departing from the spirit or scope of our techniques and it is our intent they be deemed within the scope of our invention.

I claim:

1. A method for a computer to authenticate an identity associated with an account containing a plurality of information accumulated over time comprising:
    receiving one or more importance values each corresponding to one of the plurality of information accumulated over time in the account associated with the identity, and
    calculating a value of the account by summing the importance values, and
    receiving a threshold, and
    selecting true information wherein the true information is selected among the plurality of information accumulated over time in the account associated with the identity, and
    generating false information whereby the false information is not part of the account associated with the identity, and
    selecting one or more particulars among the true information and the false information whereby the number of the selected particulars is proportional to the value of the account, and presenting in a display the selected particulars whereby each selected particular is associated with a binary choice for a user to answer whether the respective selected particular is true or false, and receiving, from a user, the binary choices associated with the selected particulars, and calculating a percentage of correct answers whereby the percentage of correct answers uses a sum weighted by a variance in length of time for the user to answer the displayed binary choice, and verifying if the percentage of correct answers is greater than the threshold to validate authentication of the identity of the user.

2. The method of claim 1, whereby the percentage of correct answers uses a sum weighted by the importance values of the respective true particulars selected and presented in the display.

\* \* \* \* \*